United States Patent [19]

Michael et al.

[11] 4,391,917

[45] Jul. 5, 1983

[54] ALUMINO-SILICATE REFRACTORY BRICK

[75] Inventors: David J. Michael, White Oak; Berhl E. Wishon, Bethel Park, both of Pa.

[73] Assignee: Dresser Industries, Inc., Dallas, Tex.

[21] Appl. No.: 402,008

[22] Filed: Jul. 26, 1982

Related U.S. Application Data

[63] Continuation-in-part of Ser. No. 200,809, Oct. 27, 1980, abandoned.

[51] Int. Cl.$^3$ .................. C04B 35/18; C04B 35/52
[52] U.S. Cl. ............................. 501/100; 501/127; 501/128
[58] Field of Search .................. 501/100, 128, 127

[56] References Cited

U.S. PATENT DOCUMENTS

| | | | |
|---|---|---|---|
| 247,329 | 9/1881 | Flannery | 106/67 |
| 2,102,976 | 12/1937 | Seil | 106/65 |
| 2,949,637 | 8/1960 | Holowaty et al. | 106/56 |
| 3,003,887 | 10/1961 | Kiehl | 106/56 |
| 4,108,675 | 8/1978 | Tomita et al. | 106/56 |

OTHER PUBLICATIONS

*Industrial Minerals & Rocks*, Am. Inst. of Mining and Metallurgical Engineers, N.Y., 1949, pp. 895–898 and 917.

*Primary Examiner*—Mark Bell
*Attorney, Agent, or Firm*—Raymond T. Majesko

[57] ABSTRACT

Carbonaceous bonded refractory shapes in which the predominant refractory aggregate is andalusite, being characterized by the absence of substantial shrinkage after coking at 2000° F.

7 Claims, No Drawings

ALUMINO-SILICATE REFRACTORY BRICK

BACKGROUND OF THE INVENTION

This is a Continuation-in-part of U.S. Application Ser. No. 200,809 filed Oct. 27, 1980, now abandoned.

Natural alumino-silicates which include, among others, clays, diaspore, kyanites and bauxites, are the major ingredients for a large number of refractory brick currently manufactured. When the brick analyze less than about 50% $Al_2O_3$, they are typically characterized in the art as fire clay brick. If they analyze more than 50% $Al_2O_3$, they are typically characterized as high alumina brick. Very generally, the properties of alumino-silicate brick vary with the percentage alumina they contain. This may be explained to a large extent by the quantity and type of mineral and glass phases formed by the alumino-silicate materials when the brick are burned.

As the alumina content of fire clay and high alumina brick is increased, resistance to load at elevated temperatures tends to increase. Also, resistance to spalling on rapid temperature change tends to increase. These property changes are usually attributed to a reduction in quantity of low refractory and brittle silicate glasses present in the groundmass of the brick. On the other hand, increasing the alumina usually results in an increase in porosity making the brick physically more vulnerable to the chemical attack of metallurgical slags. In addition, brick higher in alumina tend to have less resistance to alkali vapors and shrink in service after cooling from high temperatures.

A few words here are appropriate as to what is meant by silicious groundmass. Alumina and silica present in alumino-silicate refractories react on firing to form, for the most part, the mineral mullite. Three moles of alumina react with two moles of silica. If the ratio of alumina to silica exceeds 3 to 2, the burned brick will also contain coroundum. If the ratio is less than 3 to 2, the burned brick will be substantially mullite and one of the crystalline or glassy forms of silica. Depending on the impurities present and the heat treatment, the silica will, to some extent, be in the form of a glass. The lower the alumina to silica ratio, the more $SiO_2$ that will be present in a crystalline or glassy form. The amount of glass then relates to the amount of shrinkage encountered.

It is among the objects of the present invention to provide alumino-silicate refractory shapes characterized by the absence of shrinkage after coking at 2000° F. and the absence of mullite.

In accordance with the present invention, there is provided carbonsceous bonded refractory shapes comprising from about 1 to 35%, by weight, carbon and the balance a non-basic refractory aggregate. The refractory aggregate consists essentially of at least about 75%, by weight, andalusite.

Preferably, the balance of the refractory aggregate, if not all andalusite, is pure alumina or another aluminum silicate other than andalusite. The shapes preferably contain an amount up to about 30%, by weight, flake graphite. They may also contain an amount less than about 7.5%, by weight, amorphous graphite and/or carbon black. Generally, the shapes have between about 0.1 and 1% volume expansion with andalusite comprising at least about 65%, by weight, of the total batch. This expansion is important because it will prevent brick linings from becoming loose when cooling from high temperatures takes place.

Andalusite is a mineral having the same chemical formula ($Al_2SiO_5$) as sillimanite and kyanite but with different physical properties.

A better understanding and further features and advantages of the practice of this invention will become readily apparent to those skilled in the art by a study of the following detailed description and examples. It should of course, be understood that these examples are given by way of explanation, and not by way of limitation. All size gradings are according to the Tyler Series, unless otherwise specified. All chemical analyses, unless otherwise specified, are on the basis of an oxide analysis in conformity with the conventional practices of reporting the chemical content of refractory materials. All analyses should be considered typical. All parts and percentages are by weight.

The mixes of the examples were all fabricated into brick in the same manner. The refractory aggregate was size graded and mixed with a phenolic novolak resin. The size graded batches were tempered in a muller-type mixer to render the batch pressable. The batches were pressed into brick at about 18,000 psi and the brick were dried at about 250° F. for about 12 hours. After cooling, the brick were submitted to tests to determine their dried density and volume change properties after coking. Various alumina-silicate shapes were preapred as shown in Table I below.

TABLE I

| MIX: | 1 | 2 | 3 | 4 | 5 | 6 | 7 | 8 |
|---|---|---|---|---|---|---|---|---|
| Alumino-Silicate Grain (50% $Al_2O_3$) | 75.8% | 75% | 45% | 80% | — | — | — | 90% |
| Alumino-Silicate Grain (60% $Al_2O_3$) | — | — | — | — | 90% | — | — | — |
| Alumino-Silicate Grain (70% $Al_2O_3$) | — | — | — | — | — | 90% | — | — |
| Calcined Bauxite | — | 10 | — | — | — | — | — | — |
| Tabular Alumina | — | — | — | — | — | — | 90% | — |
| Ball Clay | — | 5 | — | — | — | — | — | — |
| Cristobalite | — | — | — | 10 | — | — | — | — |
| Volatilized Silica | 4 | — | — | — | — | — | — | — |
| Calcined Alumina | 10.2 | — | — | — | — | — | — | — |
| Flake Graphite | 10 | 10 | 10 | 10 | 10 | 10 | 10 | 10 |
| Pyrophyllite | — | — | 45 | — | — | — | — | — |
| Plus Additions: | | | | | | | | |
| Novolak Resin | 5 | 5 | 5 | 5 | 4.5 | 4.5 | 4.5 | 5 |
| Hexamethylenetetramine | 0.55 | 0.55 | 0.55 | 0.55 | 0.33 | 0.33 | 0.33 | 0.55 |
| Bulk Density after Drying at 205° F. pcf | 152 | 153 | 148 | 142 | 154 | 156 | 186 | 146 |
| Volume change after Coking at 2000° F., % | −0.5 | −0.9 | +2.6 | −0.4 | −1.5 | −1.2 | −0.4 | −0.4 |

TABLE I-continued

| MIX: | 1 | 2 | 3 | 4 | 5 | 6 | 7 | 8 |
|---|---|---|---|---|---|---|---|---|
| | | | Bloated | | | | | |

Mixes comprising predominantly a different alumino-silicate grain other than andalusite had shrinkage properties running from −0.4 to about −1.5%. The brick in which another refractory material was added had shrinkages somewhere in between. The example mix No. 3 containing equal amounts of alumino-silicate grain and phrophyllite expanded, but the expansion was accompanied by bloating.

Mixes 9 through 14 in Table II were made with the following andalusite to other alumino-silicate grain ratios: 50-50, 55-45, 60-40, 65-35, 70-30; and 75-25.

TABLE II

| MIX: | 9 | 10 | 11 | 12 | 13 | 14 |
|---|---|---|---|---|---|---|
| Alumino-Silicate Grain (60% Al₂O₃) | 45% | 40.5% | 36% | 31.5% | 27% | 22.5% |
| Andalusite | 45 | 49.5 | 54 | 58.5 | 63 | 67.5 |
| Flake Graphite | 10 | 10 | 10 | 10 | 10 | 10 |
| Andalusite/grain ratio | 50/50 | 55/45 | 60/40 | 65/35 | 70/30 | 75/25 |
| Plus Additions: | | | | | | |
| Novolak Resin | 4.75 | 4.75 | 4.75 | 4.75 | 4.75 | 4.75 |
| Hexamethylenetetramine | 0.35 | 0.35 | 0.35 | 0.35 | 0.35 | 0.35 |
| Bulk density after Drying at 400° F. pcf | 158 | 159 | 159 | 160 | 160 | 161 |
| Volume change after Coking at 2000° F., % | −0.55 | −0.63 | −0.67 | −0.91 | −0.46 | +0.11 |

All of the mixes except mix 14, with 75/25 andalusite-alumino silicate grain, exhibited volume shrinkage after coking.

Mixes in Table III below were made with andalusite as the only refractory aggregate. However, the mixes contained an amount up to 30% flake graphite and an amount up to 5% of amorphous graphite and one with 5% carbon black.

TABLE III

| MIX: | 15 | 16 | 17 | 18 | 19 | 20 | 21 |
|---|---|---|---|---|---|---|---|
| Andalusite | 100% | 90% | 80% | 70% | 97.5% | 95% | 95% |
| Flake Graphite | — | 10 | 20 | 30 | — | — | — |
| Graphite Amorphous | — | — | — | — | 2.5 | 5 | — |
| Carbon Black | — | — | — | — | — | — | 5 |
| Plus Additions: | | | | | | | |
| Novolak Resin | 3.0 | 3.0 | 3.0 | 3.0 | 3.5 | 3.5 | 3.5 |
| Hexamethylenetetramine | 0.22 | 0.22 | 0.22 | 0.22 | 0.26 | 0.26 | 0.26 |
| Bulk Density after Baking at 275° F., pcf | 166 | 164 | 163 | 159 | 167 | 166 | 165 |
| Volume change on Coking, % | +1.2 | +0.6 | +0.4 | +0.4 | +0.7 | +0.4 | +0.8 |

Mixes 15 through 18 contained 0 to 30% flake graphite. As the amount of flake graphite increased from 0 to 30%, the amount of volume expansion after coking at 2000° F., decreased from 1.2% to 0.4%. Mix 15 with only the resin present in addition to andalusite, would contain about 1.3% carbon derived entirely from the resin. Mixes 19 and 20 which contain 2.5% and 5%, respectively, amorphous graphite expanded after coking. Additional testing indicated that expansion was achieved when less than 7.5% amorphous graphite was used. Mix 21 which contains 5% carbon black and no graphite, expanded after coking.

The sizing of the refractory aggregates used in the above examples were as follows: −3+10 mesh—30 to 40%; −10+28 mesh—15 to 25%; −28+65 mesh—10 to 15%; and the balance −65 mesh. The typical chemical analyses of the refractory materials used in the examples are set forth in Table IV below.

TABLE IV

| | Alumino-Silicate Grain (50% Al₂O₃) | Alumino-Silicate Grain (60% Al₂O₃) | Alumino-Silicate Grain (70% Al₂O₃) | Calcined Bauxite | Pyro-Phyllite | Ball Clay | Andalusite |
|---|---|---|---|---|---|---|---|
| SiO₂ | 46.9% | 39.6% | 24.6% | 5.9% | 78.7% | 62.9% | 38.0% |
| Al₂O₃ | 49.6 | 59.2 | 69.2 | 89.0 | 19.5 | 33.5 | 60.2 |
| TiO₂ | 2.4 | 2.6 | 3.2 | 3.2 | 0.4 | 2.1 | 0.20 |
| Fe₂O₃ | 1.01 | 1.1 | 1.0 | 2.1 | 0.6 | 1.0 | 0.99 |
| CaO | 0.02 | 0.02 | 0.02 | 0.02 | 0.2 | 0.2 | 0.07 |
| MgO | 0.04 | 0.05 | 0.04 | 0.02 | 0.1 | 0.3 | 0.12 |
| Total Alk | 0.12 | 0.11 | 0.07 | 0.06 | 0.2 | 0.5 | 0.29 |
| LOI | Nil | Nil | Nil | Nil | 3.8 | 12.3 | +0.42* |

*This is a weight gain.

Other materials used in the exemplary refractory compositions and not included in Table IV, are calcined alumina and tabular alumina. Both of these materials contain about 99% Al₂O₃, the balance trace impurities and are well known in the art. Similarly, the crystoballite and volatilized silica are high purity silicious materials, i.e. 99% SiO₂, and are also well known in the art.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. Carbonaceous bonded refractory shapes comprising from about 1 to 35%, by weight, carbon and the balance a non-basic refractory aggregate, said refractory aggregate comprising at least about 75%, by weight, andalusite, said refractory shapes being characterized by the absence of substantial shrinkage after coking at 2000° F., and the absence of mullite.

2. Shapes of claim 1 in which the balance of the non-basic refractory aggregate is aluminum silicates other than andalusite or alumina.

3. Shapes of claim 1, which contains an amount up to about 30%, by weight, flake graphite.

4. Shapes of claim 1 which contains at least, about 65% andalusite based on the total weight of the composition.

5. Shapes of claim 1, characterized by having between about 0.1% and 1% volume expansion after coking at 2000° F.

6. Shapes of claim 1 which contain an amount up to about 5%, by weight, carbon black.

7. Shapes of claim 1 which contain an amount less than about 7.5% amorphous graphite.

* * * * *